(12) United States Patent
Lin

(10) Patent No.: US 9,759,312 B2
(45) Date of Patent: Sep. 12, 2017

(54) PRESSURE CONTROL SYSTEM OF TORQUE CONTROL DEVICE

(71) Applicants: CHERY AUTOMOBILE CO., LTD., Wuhu (CN); WUHU POWER-TECHNOLOGY RESEARCH CO., LTD., Wuhu (CN)

(72) Inventor: Jian Lin, Wuhu (CN)

(73) Assignee: Chery Automobile Co., LTD. (CN)

( * ) Notice: Subject to any disclaimer, the term of this patent is extended or adjusted under 35 U.S.C. 154(b) by 246 days.

(21) Appl. No.: 14/407,377

(22) PCT Filed: Aug. 12, 2013

(86) PCT No.: PCT/CN2013/081284
§ 371 (c)(1),
(2) Date: Dec. 11, 2014

(87) PCT Pub. No.: WO2014/029283
PCT Pub. Date: Feb. 27, 2014

(65) Prior Publication Data
US 2015/0167831 A1 Jun. 18, 2015

(30) Foreign Application Priority Data
Aug. 20, 2012 (CN) .......................... 2012 1 0295466

(51) Int. Cl.
*F16H 61/00* (2006.01)
*F16D 48/02* (2006.01)

(52) U.S. Cl.
CPC ......... *F16H 61/0021* (2013.01); *F16D 48/02* (2013.01); *F16D 2048/0209* (2013.01); *F16D 2048/0221* (2013.01)

(58) Field of Classification Search
CPC ................. F16H 61/0021; F16H 48/02; F16H 2048/0209; F16H 2048/0221; F16H 61/00
See application file for complete search history.

(56) References Cited

U.S. PATENT DOCUMENTS 6,471,613 B1 * 10/2002 Botosan .............. F16H 61/0021
475/120
2006/0223670 A1 * 10/2006 Nishikawa ............. B60K 6/387
477/168

(Continued)

FOREIGN PATENT DOCUMENTS

CN 1858467 11/2006
CN 101021266 8/2007

(Continued)

OTHER PUBLICATIONS

Search Report dated Nov. 28, 2013 for International Application No. PCT/US2013/081284 (8 pgs.).

*Primary Examiner* — Huan Le
(74) *Attorney, Agent, or Firm* — Timothy S. Westby; Porter Hedges LLP

(57) ABSTRACT

A pressure control system for a torque control device includes a control pressure regulating valve (110) outputting a control pressure, a pressure switching valve (120) and a jointing pressure regulating valve (130) connected to a piston chamber of the torque control device. When the control pressure is lower than a set value of a spring of the pressure switching valve, the jointing pressure regulating valve (130) outputs jointing pressure that is in fixed proportion with the control pressure. When the control pressure reaches the set value of the spring of the pressure switching valve, the jointing pressure regulating valve (130) outputs a jointing pressure that is larger than the fixed proportion with the control pressure. The pressure control system ensures that the torque control device has both precise and large torque capacity.

7 Claims, 8 Drawing Sheets

(56) References Cited

U.S. PATENT DOCUMENTS

2007/0202979 A1\* 8/2007 Botosan .............. F16H 61/0021
   475/120
2012/0000740 A1   1/2012 Shimizu et al.

FOREIGN PATENT DOCUMENTS

| CN | 101878383 | 11/2010 |
| CN | 102797840 | 11/2012 |
| JP | 2005042888 | 2/2005 |

\* cited by examiner

US 9,759,312 B2

PRESSURE CONTROL SYSTEM OF TORQUE CONTROL DEVICE

CROSS-REFERENCE TO RELATED APPLICATIONS

This application is the US national phase entry of PCT Application No. PCT/CN2013/081284, entitled "PRESSURE CONTROL SYSTEM OF TORQUE CONTROL DEVICE" filed Aug. 12, 2013. The disclosure of said application is hereby incorporated herein by reference.

TECHNICAL FIELD

The present disclosure relates to the field of hydraulic control, in particular to the field of hydraulic control to an automatic transmission.

BACKGROUND

By now, the following existing techniques have been searched: 1. CN200510127583.5, entitled "Pressure Control Systems for Automatic Transmissions"; 2. CN200510117492.3, entitled "Hydraulic Control Systems for Automatic Transmission Units for Vehicles"; 3. U.S. Pat. No. 6,591,958, entitled "Pressure Control Apparatus for a Torque-transmitting Mechanism"; and 4. CN200510084452.3, entitled "Regulating valves of torque-transmitting mechanisms and method for engaging torque-transmitting mechanisms".

In an automatic transmission, the transmission torque of the torque control devices such as clutches, brakes or brake bands mainly depends on a jointing pressure of a piston chamber thereof. During the jointing process of the torque control devices such as clutches, the transmission torque thereof is controlled by controlling the jointing pressure. A TCU (short for automatic Transmission Control Unit, alternatively translated as Electronic Control Device) outputs a signal to control an electromagnetic valve, and a pressure of the electromagnetic valve controls a pressure regulating valve to provide this jointing pressure, wherein the pressure of the electromagnetic valve serves as a pilot control valve. Thus, if it is desired to ensure an adequate torque capacity, the resolution of a pressure control will reduce, which is disadvantageous for the precise control to a torque device.

SUMMARY

An object of the present disclosure is to provide a control system which is advantageous for precise control to a pressure of a torque control device.

To achieve above object, the present disclosure adopts any one of the following technical solutions.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving a jointing pressure, an input interface for receiving a fixed pressure, an output interface connected to a feedback interface of a jointing pressure regulating valve, and a control interface located on one side of a valve core of the pressure switching valve and connected to an oil passage of the control pressure; a jointing pressure regulating valve, which has an input interface connected to an oil passage of a system main oil pressure, an output interface of a jointing pressure for a piston chamber of a torque transmission device, a feedback interface and a spring chamber that are located on one side of a valve core of the jointing pressure regulating valve and used for receiving a pressure output from the pressure switching valve, and a control interface located on the other side of the valve core of the jointing pressure regulating valve and connected to the oil passage of the control pressure; and when the control pressure is lower than a set value of a spring of the pressure switching valve, the pressure switching valve connects the jointing pressure with the feedback interface of the jointing pressure regulating valve, and the jointing pressure regulating valve outputs a jointing pressure in proportion to the control signal; and, when the control pressure reaches the set value of the spring of the pressure switching valve, the pressure switching valve connects the fixed pressure with the feedback interface of the jointing pressure regulating valve, and the jointing pressure regulating valve allows a main pressure interface to communicate with a jointing pressure interface.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving a jointing pressure, an input interface for receiving a control pressure, an output interface connected to a feedback interface of a jointing pressure regulating valve, and a control interface located on one side of a valve core of the pressure switching valve and connected to an oil passage of the control pressure; a jointing pressure regulating valve, which has an input interface connected to an oil passage of a system main oil pressure, an output interface of a jointing pressure for a piston chamber of a torque transmission device, and a feedback interface and a spring chamber that are located on one side of a valve core of the jointing pressure regulating valve and used for receiving a pressure output from the pressure switching valve; and when the control pressure is lower than a set value of a spring of the pressure switching valve, the pressure switching valve connects the jointing pressure with the feedback interface of the jointing pressure regulating valve, and the jointing pressure control valve outputs a jointing pressure in proportion to the control signal; and, when the control pressure reaches the set value of the spring of the pressure switching valve, the pressure switching valve connects the control pressure with the feedback interface of the jointing pressure regulating valve, and the jointing pressure regulating valve allows a main pressure interface to communicate with a jointing pressure interface.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving a jointing pressure, an input interface for receiving the control pressure, an output interface connected to a control interface of a jointing pressure regulating valve, and a control interface located on one side of a valve core of the pressure switching valve and connected to an oil passage of the control pressure; a jointing pressure regulating valve, which has an input interface connected to an oil passage of a system main oil pressure, an output interface of a jointing pressure for a piston chamber of a torque transmission device, a feedback interface and a spring chamber that are located on one side of a valve core of the jointing pressure regulating valve and used for receiving a jointing pressure, and a control interface located on the other side of the valve core of the jointing pressure regulating valve and used for receiving an output of the pressure switching valve; and when the control pressure is lower than a set value of a spring of the pressure switching valve, the pressure switching valve connects the control pressure with the control interface of the jointing pressure regulating valve, and the jointing pressure regulating valve outputs a jointing pressure in proportion to the control signal; and, when the control pressure reaches the set value of the spring of the pressure switching valve, the pressure switching valve connects the jointing pressure with the control interface of the jointing pressure regulating valve, and the jointing pressure regulating valve allows a main pressure interface to communicate with a jointing pressure interface.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving a jointing pressure, an input interface for receiving a pressure relief chamber, an output interface connected to a control interface of a jointing pressure regulating valve, and a control interface located on one side of a valve core of the pressure switching valve and connected to an oil passage of the control pressure; a selecting valve, which consists of a steel ball and has a first input port for receiving the control pressure, a second input port for receiving an output of the pressure switching valve and an output port connected to a control chamber of a jointing pressure regulating valve, the output port being always in communication with an input port having a larger pressure; a jointing pressure regulating valve, which has an input interface connected to an oil passage of a system main oil pressure, an output interface of a jointing pressure for a piston chamber of a torque transmission device, a feedback interface and a spring chamber that are located on one side of a valve core of the jointing pressure regulating valve and used for receiving a jointing pressure, and a control interface located on the other side of the valve core of the jointing pressure regulating valve and used for receiving an output of the selecting valve; and when the control pressure is lower than a set value of a spring of the pressure switching valve, the pressure switching valve connects an oil drainage chamber with an input interface of the selecting valve, the control pressure enters a control chamber of the jointing pressure control valve via the selecting valve, and the jointing pressure control valve outputs a jointing pressure in proportion to the control signal; and, when the control pressure reaches the set value of the spring of the pressure switching valve, the pressure switching valve connects the jointing pressure with an input of the selecting valve, the jointing pressure is connected to the control interface of the jointing pressure regulating valve via the selecting valve, and the jointing pressure regulating valve allows a main pressure interface to communicate with a jointing pressure interface.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving a jointing pressure, an input interface for receiving an oil drainage chamber, an output interface connected to a control interface of a jointing pressure regulating valve, and a control interface located on one side of a valve core of the pressure switching valve and connected to an oil passage of the control pressure; a jointing pressure regulating valve, which has an input interface connected to an oil passage of a system main oil pressure, an output interface of a jointing pressure for a piston chamber of a torque transmission device, a feedback interface and a spring chamber that are located on one side of a valve core of the jointing pressure regulating valve and used for receiving a jointing pressure, and a control interface for receiving an output of the pressure switching valve and a second control interface for receiving the control pressure located on the other side of the valve core of the jointing pressure regulating valve; and when the control pressure is lower than a set value of a spring of the pressure switching valve, the pressure switching valve connects a pressure relief chamber with the control interface of the jointing pressure regulating valve, and the jointing pressure regulating valve outputs a jointing pressure in proportion to the control signal; and, when the control pressure reaches the set value of the spring of the pressure switching valve, the pressure switching valve connects the jointing pressure with the control interface of the jointing pressure regulating valve, and the jointing pressure regulating valve allows a main pressure interface to communicate with a jointing pressure interface.

According to above five technical solutions, the control pressure regulating valve is generally an electromagnetic valve. The pressure while the torque control devices are jointed is controlled by a precise control to the control pressure of the electromagnetic valve. In addition, after the torque transmission devices are jointed and when the pressure of the electromagnetic valve exceeds a set value, a high pressure oil port in the pressure regulating valve is communicated with a piston chamber of the torque control device by means of the pressure switching valve, so as to ensure an adequate torque capacity.

Two other pressure control systems, which can also achieve the above objective, will be further provided as below.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving the control pressure, an input interface for receiving a pressure relief chamber, an output interface connected to a reverse control interface of a jointing pressure regulating valve, and a control interface located on one side of a valve core of the pressure switching valve and connected to an oil passage of the control pressure; a jointing pressure regulating valve, which has an input interface connected to an oil passage of a system main oil pressure, an output interface of a jointing pressure for a piston chamber of a torque transmission device, a feedback interface and a spring chamber that are located on one side of a valve core of the jointing pressure regulating valve and used for receiving a jointing pressure, a control interface located on the other side of the valve core of the jointing pressure regulating valve and connected to the oil passage of the control pressure; and a reverse control interface which has a reverse apply direction to the control interface; when the control pressure is lower than a set value of a spring of the pressure switching valve, the pressure switching valve connects the control pressure with the reverse control interface of the jointing pressure regulating valve, and the jointing pressure regulating valve outputs a jointing pressure with a smaller slope; and, when the control pressure reaches the set value of the spring of the pressure switching valve, the pressure switching valve connects the pressure relief chamber with the reverse control interface of the jointing pressure regulating valve, and the jointing pressure regulating valve outputs a jointing pressure with a larger variation slope.

A pressure control system for a torque control device, the system comprises: an electronic control device (TCU); a control pressure regulating valve for receiving a control signal from the electronic control device (TCU) and outputting a control pressure; a fixed pressure oil passage, which is an oil passage for supplying oil to the control pressure regulating valve; a pressure switching valve, which has an input interface for receiving a jointing pressure, an input interface for receiving an oil drainage chamber, an output interface connected to a feedback interface of a jointing pressure regulating valve, and a control interface located on one side of a valve core of the pressure switching valve and connected to an oil passage of the control pressure; a jointing pressure regulating valve, which has an input interface connected to an oil passage of a system main oil pressure, an output interface of a jointing pressure for a piston chamber of a torque transmission device, a feedback interface and a spring chamber for receiving a pressure output from the pressure switching valve and a second feedback port connected to an output of the pressure jointing valve that are located on one side of a valve core of the jointing pressure regulating valve, and a control interface located on the other side of the valve core of the jointing pressure regulating valve and used for receiving the control pressure; and when the control pressure is lower than a set value of a spring of the pressure switching valve, the pressure switching valve connects the jointing pressure with the feedback interface of the jointing pressure regulating valve, a feedback area of the jointing pressure regulating valve is increased, and the jointing pressure regulating valve outputs a jointing pressure with a smaller variation slope and being in proportion to the control signal; and, when the control pressure reaches the set value of the spring of the pressure switching valve, the pressure switching valve connects a pressure relief port with the feedback interface of the jointing pressure regulating valve, the feedback area of the jointing pressure regulation valve is decreased, and the jointing pressure regulating valve outputs a jointing pressure with a larger variation slope and being in proportion to the control signal.

According to the two technical solutions described above, during the torque transmission devices are jointed, by a switching of the pressure switching valve, the apply area of the control pressure of the jointing pressure regulating valve is reduced or the feedback area is increased, it is advantageous for a precise control to the jointing pressure adopting a jointing pressure with a smaller variation slope and being in proportion to the control pressure of the control pressure regulating valve; Furthermore, after the torque transmission devices are jointed, that is, after there is no relative slip, by a switching of the pressure switching valve, the apply area of the control pressure of the jointing pressure regulating valve is increased or the feedback area is reduced, so that the variation slope of the jointing pressure is increased and an adequate torque capacity is ensured.

DETAILED DESCRIPTION

Embodiment 1

Figure 3:
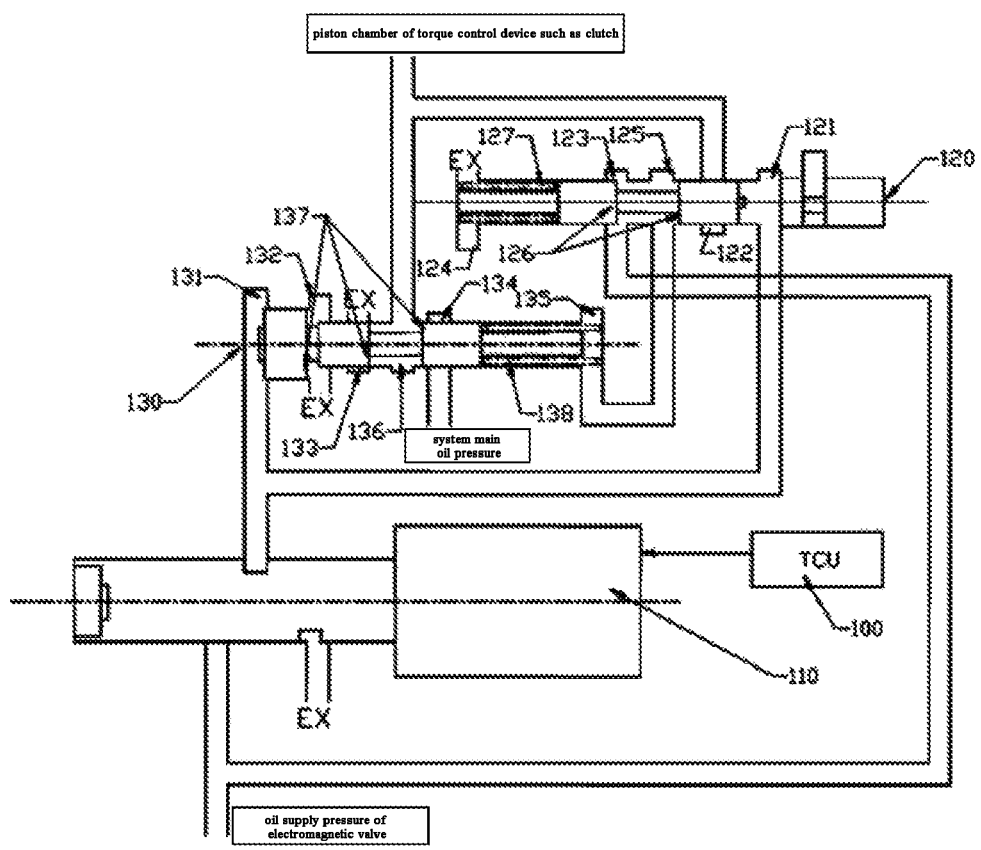
FIGS. 3-9 are schematic diagrams of hydraulic control according to the present disclosure, respectively.

In FIG. 3, a pressure control system includes an Electronic Control device (TCU) 100 and a control pressure regulating valve 110, where the control pressure regulating valve 110 is generally an electromagnetic valve; a pressure switching valve 120, a control interface 121 located in the pressure switching valve and connected to an oil passage of the control pressure, an input interface 122 located in the pressure switching valve and used for receiving a jointing pressure, an input interface 123 located in the pressure switching valve and used for receiving a fixed pressure, a spring chamber or an oil drainage pressure 124 in the pressure switching valve, an output interface 125 located in the pressure switching valve and connected to a feedback interface of a jointing pressure regulating valve, a valve core 126 in the pressure switching valve, and a spring 127 in the pressure switching valve; and a jointing pressure regulating valve 130, a control interface 131 located in the jointing pressure regulating valve and connected to the oil passage of the control pressure, a pressure relief port 132 in the jointing pressure regulating valve, a pressure relief port 133 in the jointing pressure regulating valve, a control interface 134 located in the jointing pressure regulating valve and connected to a system main oil pressure, a feedback interface and a spring chamber 135 that are located in the jointing pressure regulating valve and used for receiving a pressure output from the pressure switching valve, an output interface 136 located in the jointing pressure regulating valve and used for a jointing pressure of a piston chamber, a valve core 137 in the jointing pressure regulating valve, and a spring 138 in the jointing pressure regulating valve.

As shown in FIG. 3, the electronic control device (TCU) 100 outputs a control signal to the control pressure regulating valve 110, and the control pressure regulating valve 110 outputs a pressure in proportion to the control signal, and the output pressure of the control pressure regulating valve 110 is applied to a control chamber of the jointing pressure regulating valve 130 and a control chamber of the pressure switching valve 120 via the control interface 131 and the control interface 121. When the output pressure of the control pressure regulating valve 110 is lower than a set value of the spring of the pressure switching valve, the input interface 122 and the output interface 125 of the pressure switching valve 120 communicate with each other, and the jointing pressure enters the feedback interface and the spring chamber 135 of the jointing pressure regulating chamber 130 via the input interface 122 and the output interface 125. The jointing pressure regulating valve 130 outputs a jointing pressure in proportion to the control pressure of the control pressure regulating valve 110. When the output pressure of the control pressure regulating valve 110 is higher than the set valve of the spring 127 of the pressure switching valve 120, the input interface 123 and the output interface 125 of the pressure switching valve 120 communicate with each other, the fixed pressure for supplying oil to the control pressure regulating valve 110 enters the feedback interface 135 of the feedback chamber of the jointing pressure regulating valve 130 via the interfaces 123 and 125, the valve core 137 of the jointing pressure regulating valve 130 moves rightward, and the control interface 134 is communicated with the output interface 136, so that the jointing pressure is equal to the system main oil pressure.

Embodiment 2

Figure 4:
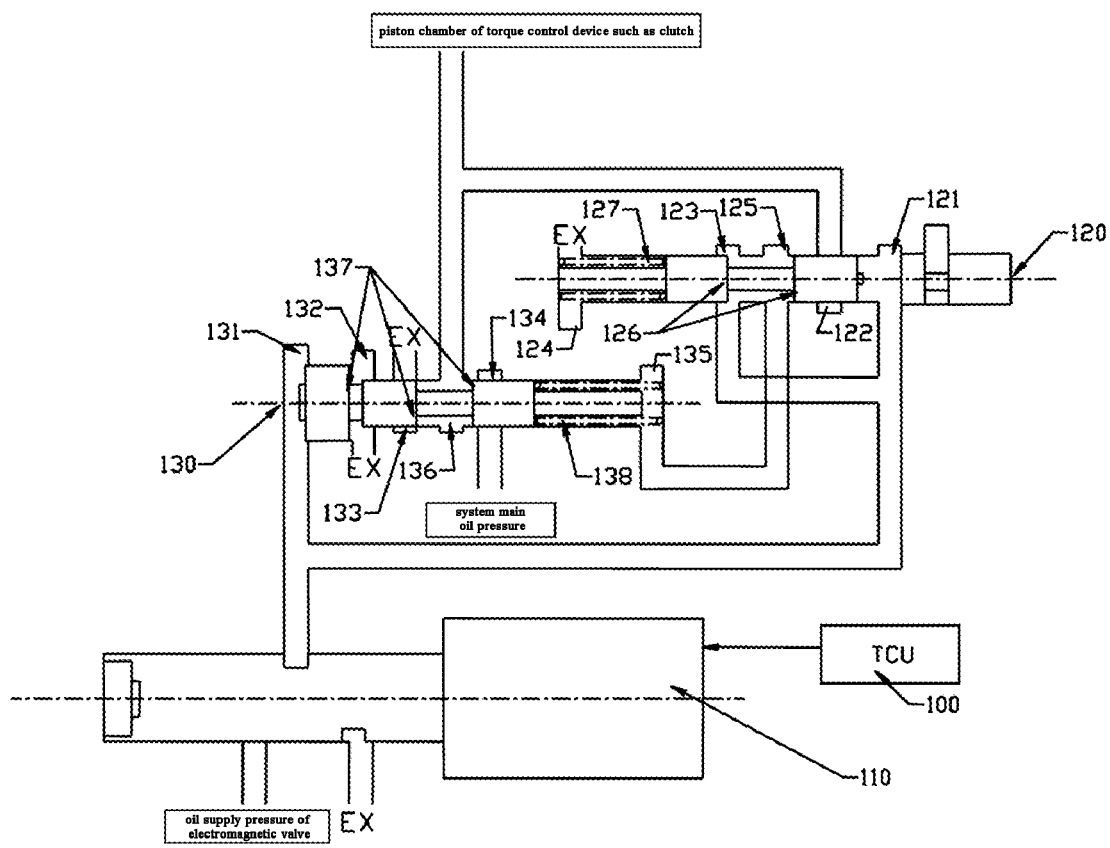

In FIG. 4, the pressure control system includes an electronic control device (TCU) 100 and a control pressure regulating valve 110, where the control pressure regulating valve 110 is generally an electromagnetic valve; a pressure switching valve 120, a control interface 121 located in the pressure switching valve and connected to an oil passage of the control pressure, an input interface 122 located in the pressure switching valve and used for receiving a jointing pressure, an input interface 123 located in the pressure switching valve and used for receiving a control pressure, a spring chamber or an oil drainage pressure 124 in the pressure switching valve, an output interface 125 located in the pressure switching valve and connected to a feedback interface of a jointing pressure regulating valve, a valve core 126 in the pressure switching valve, and a spring 127 in the pressure switching valve; and a jointing pressure regulating valve 130, a control interface 131 located in the jointing pressure regulating valve and connected to the oil passage of the control pressure, a pressure relief port 132 in the jointing pressure regulating valve, a pressure relief port 133 in the jointing pressure regulating valve, a control interface 134 located in the jointing pressure regulating valve and connected to a system main oil pressure, a feedback interface and a spring chamber 135 that are located in the jointing pressure regulating valve and used for receiving a pressure output from the pressure switching valve, an output interface 136 located in the jointing pressure regulating valve and used for a jointing pressure of a piston chamber, a valve core 137 in the jointing pressure regulating valve, and a spring 138 in the jointing pressure regulating valve.

The electronic control device (TCU) 100 outputs a control signal to the control pressure regulating valve 110, then the control pressure regulating valve 110 outputs a pressure in proportion to the control signal, and the output pressure of the control pressure regulating valve 110 is applied to a control chamber of the jointing pressure regulating valve 130 and a control chamber of the pressure switching valve 120 via the control interface 131, the control interface 121 and the input interface 123. When the output pressure of the control pressure regulating valve 110 is lower than a set value of the spring 127 of the pressure switching valve 120, the input interface 122 and the output interface 125 of the pressure switching valve 120 communicate with each other, and the jointing pressure enters the feedback interface and the spring chamber 135 of the jointing pressure regulating chamber 130 via the input interface 122 and the output interface 125. The jointing pressure regulating valve 130 outputs a jointing pressure in proportion to the control pressure of the control pressure regulating valve 110. When the output pressure of the control pressure regulating valve 110 is higher than the set valve of the spring 127 of the pressure switching valve 120, the input interface 123 and the output interface 125 of the pressure switching valve 120 communicate with each other, the control pressure output from the control pressure regulating valve 110 enters the feedback interface and spring chamber 135 of the jointing pressure regulating valve 130 via the input interface 123 and the output interface 125, the valve core 137 of the jointing pressure regulating valve 130 moves rightward, and a system main oil pressure chamber (i.e., the control interface 134) is communicated with a piston chamber of a torque control device (i.e., the output interface 136), so that the jointing pressure is equal to the system main oil pressure.

Embodiment 3

Figure 5:
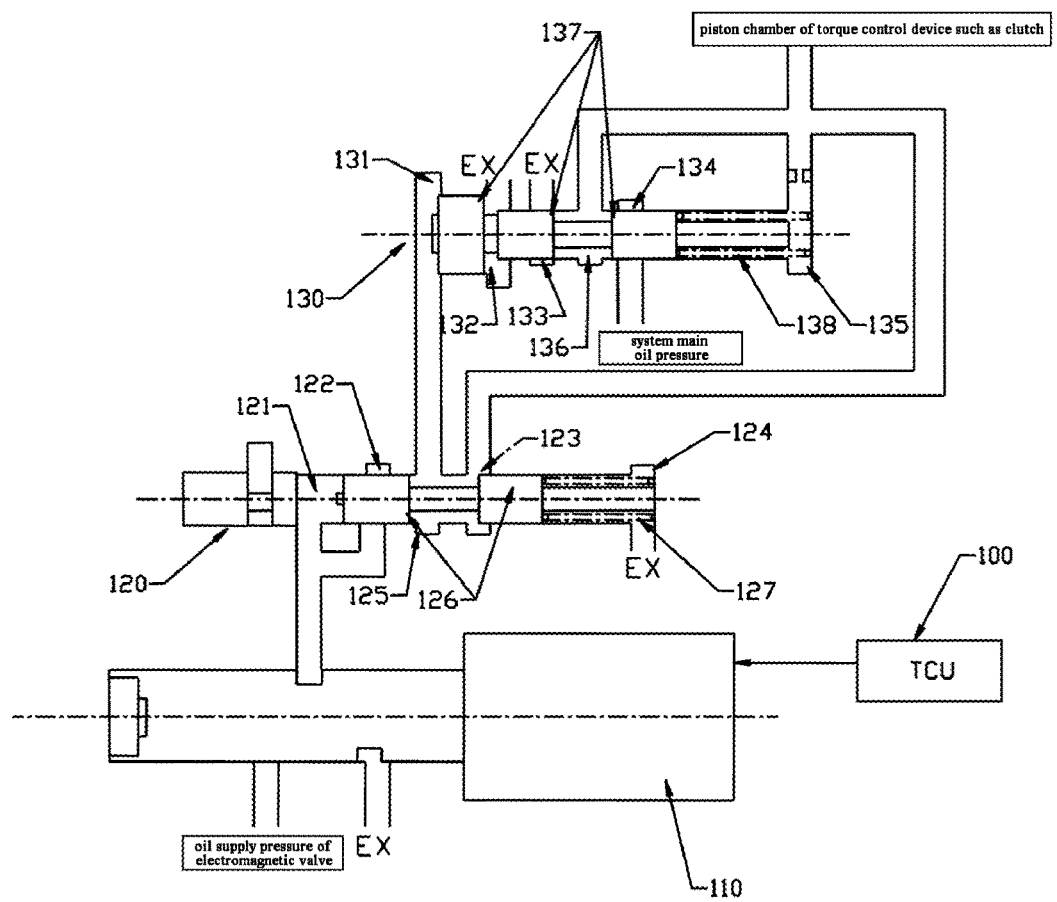

In FIG. 5, a pressure control system includes an electronic control device (TCU) 100 and a control pressure regulating valve 110, where the control pressure regulating valve 110 is generally an electromagnetic valve; a pressure switching valve 120, a control interface 121 located in the pressure switching valve and connected to an oil passage of the control pressure, an input interface 122 located in the pressure switching valve 120 and used for receiving a control pressure, an input interface 123 located in the pressure switching valve and used for receiving a jointing pressure, a spring chamber or an oil drainage pressure 124 in the pressure switching valve 120, an output interface 125 located in the pressure switching valve and connected to a control interface of a jointing pressure regulating valve, a valve core 126 in the pressure switching valve, and a spring 127 in the pressure switching valve; and a jointing pressure regulating valve 130, a control interface 131 located in the jointing pressure regulating valve and used for receiving an output of the pressure switching valve, a pressure relief port 132 in the jointing pressure regulating valve, a pressure relief port 133 in the jointing pressure regulating valve, a control interface 134 located in the jointing pressure regulating valve and connected to a system main oil pressure, a jointing pressure feedback interface and a spring chamber 135 in the jointing pressure regulating valve, an output interface 136 located in the jointing pressure regulating valve and used for a jointing pressure of a piston chamber, a valve core 137 in the jointing pressure regulating valve, and a spring 138 in the jointing pressure regulating valve.

The electronic control device (TCU) 100 outputs a control signal to the electromagnetic valve 110, the control pressure regulating valve 110 outputs a pressure in proportion to the control signal, and the output pressure of the control pressure regulating valve 110 is applied to a control chamber of the pressure switching valve 120, i.e., a control chamber where the control interface 121 is communicated with the input interface 122. When the output pressure of the control pressure regulating valve 110 is lower than a set value of the spring 127 of the pressure switching valve 120, the input interface 122 and the output interface 125 of the pressure switching valve 120 communicate with each other.

The control pressure enters a control chamber (i.e., the control interface 131) of the jointing pressure regulating valve 130 via the input interface 122 and the output interface 125. The jointing pressure regulating valve 130 outputs a jointing pressure in proportion to the control pressure of the control pressure regulating valve 110. When the output pressure of the control pressure regulating valve 110 is higher than the set valve of the spring 127 of the pressure switching valve 120, a chamber of the input interface 123 and a chamber of the output interface 125 of the pressure switching valve 120 communicate with each other, the jointing pressure enters the control chamber (i.e., the feedback interface and the spring chamber 135) of the jointing pressure regulating valve 130 via the interfaces 123 and 125, the valve core 137 of the jointing pressure regulating valve 130 moves rightward, and a system main oil pressure chamber (i.e., the control interface 134) is communicated with a piston chamber (i.e., the output interface 136) of a torque control device, so that the jointing pressure is equal to the system main oil pressure.

Embodiment 4

Figure 6:
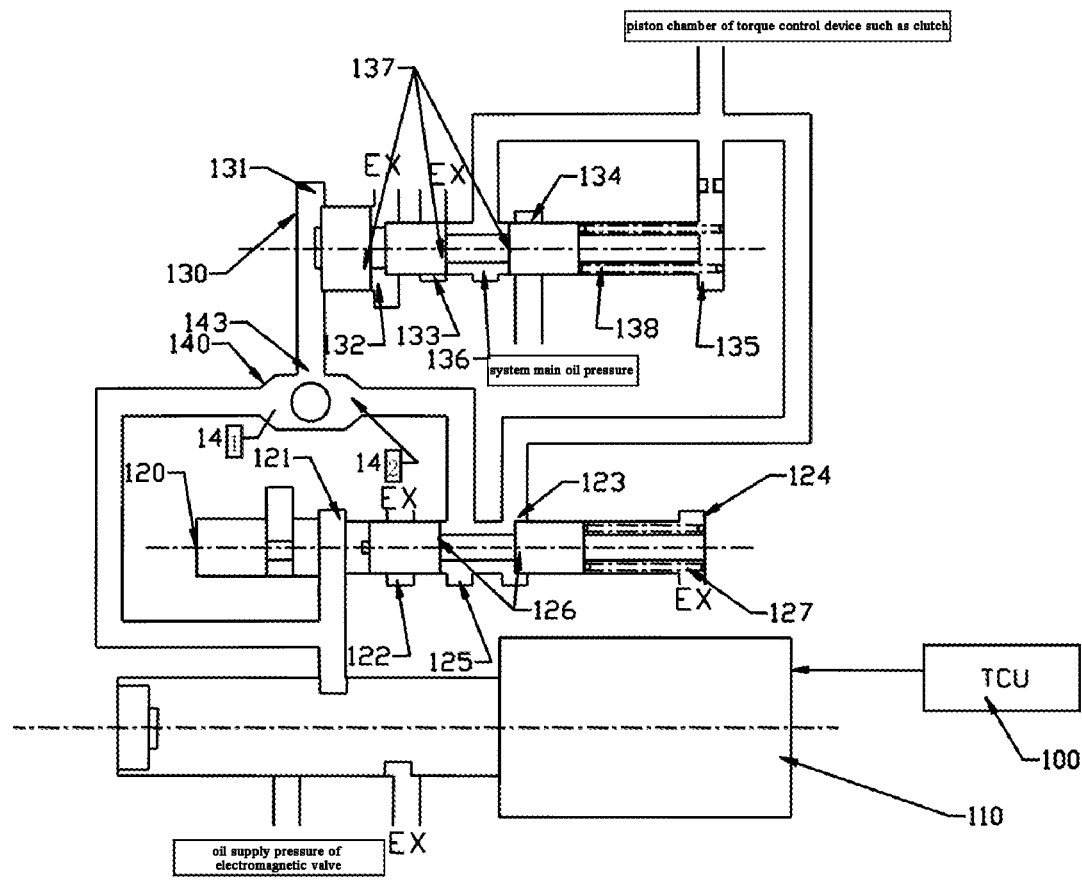

In FIG. 6, a pressure control system includes an electronic control device (TCU) 100 and a control pressure regulating valve 110, where the control pressure regulating valve 110 is generally an electromagnetic valve; a pressure switching valve 120, a control interface 121 located in the pressure switching valve 120 and connected to an oil passage of the control pressure, a pressure relief port 122 in the pressure switching valve 120, an input interface 123 located in the pressure switching valve 120 and used for receiving a jointing pressure, a spring chamber or an oil drainage pressure 124 in the pressure switching valve 120, an output interface 125 located in the pressure switching valve 120 and connected to a second input port 12 of a selecting valve 140, a valve core 126 in the pressure switching valve 120, and a spring 127 in the pressure switching valve 120; a jointing pressure regulating valve 130, a control interface 131 located in the jointing pressure regulating valve 130 and used for receiving an output of the selecting valve 140, a pressure relief port 132 in the jointing pressure regulating valve 130, a pressure relief port 133 in the jointing pressure regulating valve 130, a control interface 134 located in the jointing pressure regulating valve 130 and connected to a system main oil pressure, a jointing pressure feedback interface and a spring chamber 135 in the jointing pressure regulating valve 130, an output interface 136 located in the jointing pressure regulating valve and used for a jointing pressure of a piston chamber, a valve core 137 in the jointing pressure regulating valve 130, and a spring 138 in the jointing pressure regulating valve 130; and a selecting valve 140, a first input port 141 for receiving a control pressure, a second input port 142 for receiving an output of the pressure switching valve 120, and an output port 143 of the selecting valve 140.

The electronic control device (TCU) 100 outputs a control signal to the control pressure regulating valve 110, the control pressure regulating valve 110 outputs a pressure in proportion to the control signal, and the output pressure of the control pressure regulating valve 110 is applied to a control chamber (i.e., the control interface 121) of the pressure switching valve 120 and the first input port 141 of the selecting valve 140. When the output pressure of the control pressure regulating valve 110 is lower than a set value of the spring 127 of the pressure switching valve 120, the pressure relief port 122 of the pressure switching valve 120 is communicated with the second input port 142 of the selecting valve 140, and the pressure of an oil drainage chamber enters the second input port (i.e., a control chamber 142) of the selecting valve 140 via the interfaces 122 and 125. The pressure of the control pressure enters the jointing pressure regulating valve 130 via the first input port 141 of the selecting valve 140, and the control pressure regulating valve outputs a jointing pressure in proportion to the control pressure of the control pressure regulating valve 110. When the output pressure of the control pressure regulating valve 110 is higher than the set valve of the spring 127 of the pressure switching valve 120, the input interface 123 of the pressure switching valve 120 is communicated with a chamber of the output interface 125, the jointing pressure enters the second input port (i.e., a control chamber 142) of the selecting valve via the interfaces 123 and 125, then enters a control chamber (i.e., the control interface 131) of the jointing pressure regulating valve 130 via the selecting valve 140, the valve core 137 of the jointing pressure regulating valve 130 moves rightward, and the control interface 134 of a system main oil pressure chamber is communicated with the output interface 136 of a piston chamber of a torque control device, so that the jointing pressure is equal to the system main oil pressure.

Embodiment 5

Figure 7:
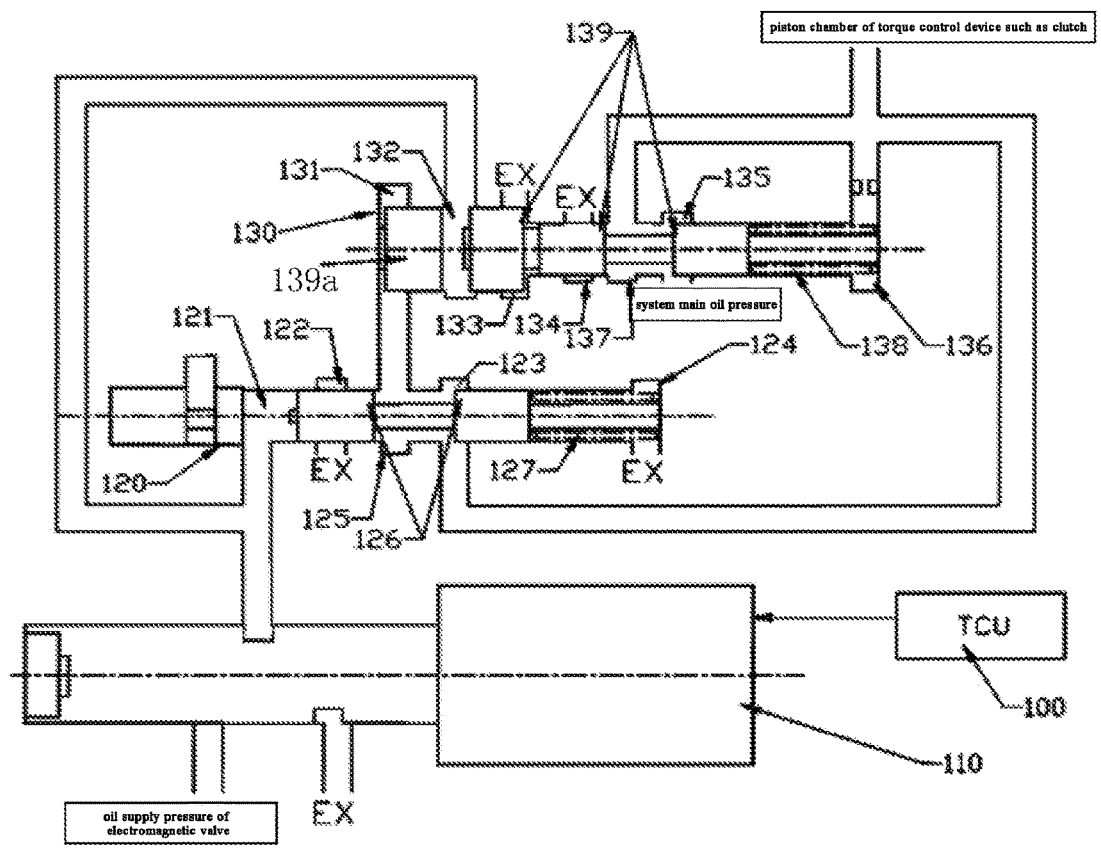

In FIG. 7, a pressure control system includes an electronic control device (TCU) 100 and a control pressure regulating valve 110, where the control pressure regulating valve 110 is generally an electromagnetic valve; a pressure switching valve 120, a control interface 121 located in the pressure switching valve and connected to an oil passage of the control pressure, a pressure relief port 122 in the pressure switching valve, an input interface 123 located in the pressure switching valve and used for receiving a jointing pressure, a spring chamber or an oil drainage pressure 124 in the pressure switching valve, an output interface 125 located in the pressure switching valve and connected to a control interface of a jointing pressure regulating valve, a valve core 126 in the pressure switching valve, and a spring 127 in the pressure switching valve; and a jointing pressure regulating valve 130, a control interface 131 located in the jointing pressure regulating valve 130 and used for receiving an output of the pressure switching valve, a control interface 132 located in the jointing pressure regulating valve 130 and used for receiving a control pressure, a pressure relief port 133 in the jointing pressure regulating valve 130, a pressure relief port 134 in the jointing pressure regulating valve 130, a control interface 135 located in the jointing pressure regulating valve 130 and connected to a system main oil pressure, a jointing pressure feedback interface and a spring chamber 136 in the jointing pressure regulating valve 130, an output interface 137 located in the jointing pressure regulating valve and used for a jointing pressure of a piston chamber, a spring 138 in the jointing pressure regulating valve 130, a valve core 139 in the jointing pressure regulating valve 130, and a small valve core 139a in the jointing pressure regulating valve 130.

The electronic control device (TCU) 100 outputs a control signal to the control pressure regulating valve 110, the control pressure regulating valve 110 outputs a pressure in proportion to the control signal, and the output pressure of the control pressure regulating valve 110 is applied to a chamber to which a control chamber (i.e. the control interface 121) of the pressure switching valve 120 and the control interface 132 of the jointing pressure regulating valve 110 are connected. When the output pressure of the control pressure regulating valve 110 is lower than a set value of the spring 127 of the pressure switching valve 120, the pressure relief port 122 of the pressure switching valve 120 is communicated with a chamber where the output interface 125 is located, and the pressure of an oil drainage chamber enters a control chamber (i.e., the control interface 131) of the jointing pressure regulating valve 130 via the pressure relief port 122 and the output interface 125. The jointing pressure regulating valve 130 outputs a jointing pressure in proportion to the control pressure of the control pressure regulating valve 110. When the output pressure of the control pressure regulating valve 110 is higher than the set valve of the spring 127 of the pressure switching valve 120, the input interface 123 of the pressure switching valve 120 is communicated with the chamber where the output interface 125 is located, the jointing pressure enters the control interface 131 of the jointing pressure regulating valve 130 via the interfaces 123 and 125 and then enters a control chamber of the jointing pressure regulating valve 130, the valve core 139 of the jointing pressure regulating valve 130 moves rightward, and a system main oil pressure chamber (i.e., the control interface 135) is communicated with a piston chamber of a torque control device, i.e., the output interface 137 of the jointing pressure, so that the jointing pressure is equal to the system main oil pressure.

Figure 1:
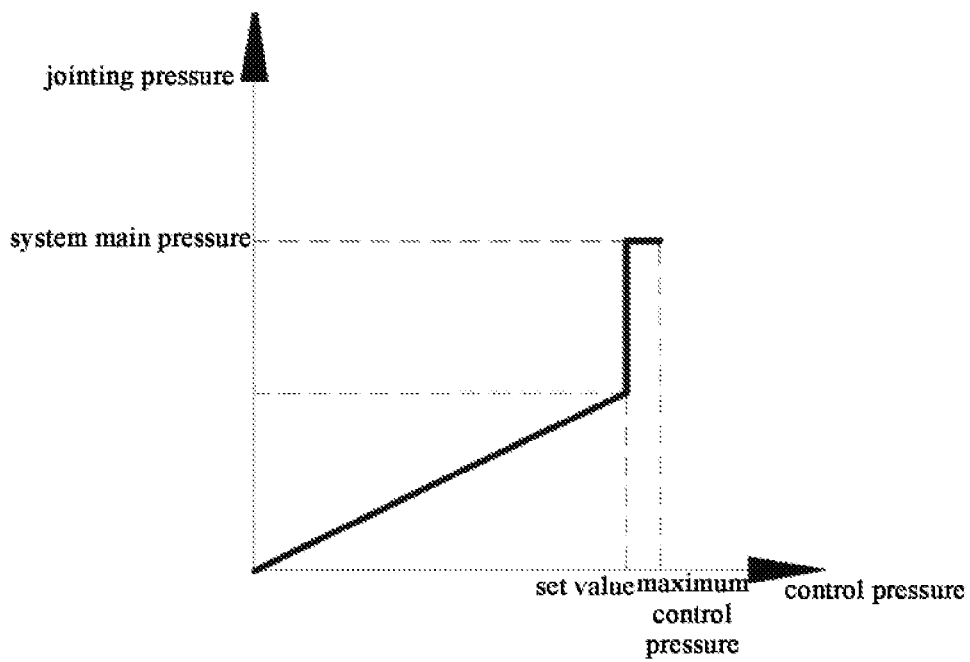
FIG. 1 and FIG. 2 are diagrams showing two specific relations between a control pressure and a jointing pressure, respectively.

In Embodiments 1-5 described above, the control pressure regulating valve is generally an electromagnetic valve. The relation between a control pressure and a jointing pressure is shown as FIG. 1, and the pressure while the torque control devices are jointed is controlled by a precise control to the control pressure of the electromagnetic valve. In addition, after the torque transmission devices are jointed and when the pressure of the electromagnetic valve exceeds a set valve, a high pressure oil port in the pressure regulating valve is communicated with a piston chamber of the torque control device by means of the pressure switching valve, so as to ensure an adequate torque capacity.

Figure 8:
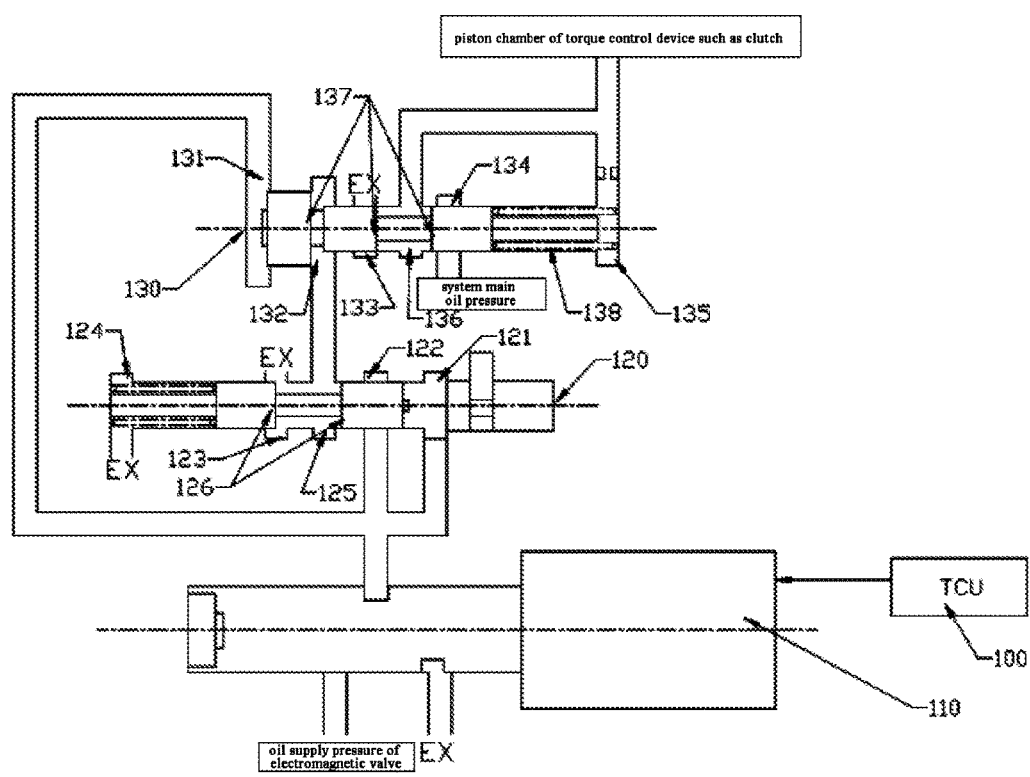

In FIG. 8, a pressure control system includes an electronic control device (TCU) 100 and a control pressure regulating valve 110, where the control pressure regulating valve 110 is generally an electromagnetic valve; a pressure switching valve 120, a control interface 121 located in the pressure switching valve and connected to an oil passage of the control pressure, an input interface 122 located in the pressure switching valve and used for receiving a control pressure, an input interface 123 located in the pressure switching valve and used for receiving a pressure relief chamber, a spring chamber or an oil drainage pressure 124 in the pressure switching valve, an output interface 125 located in the pressure switching valve and connected to a reverse control interface of a jointing pressure regulating valve, a valve core 126 in the pressure switching valve, and a spring 127 in the pressure switching valve; and a jointing pressure regulating valve 130, a control interface 131 located in the jointing pressure regulating valve and connected to the oil passage of the control pressure, a pressure relief port 132 in the jointing pressure regulating valve, a pressure relief port 133 in the jointing pressure regulating valve, a control interface 134 located in the jointing pressure regulating valve and connected to a system main oil pressure, a feedback interface and a spring chamber 135 which are located in the jointing pressure regulating valve and used for receiving a jointing pressure, an output interface 136 located in the jointing pressure regulating valve and used for a jointing pressure of a piston chamber, a valve core 137 in the jointing pressure regulating valve, and a spring 138 in the jointing pressure regulating valve.

The electronic control device (TCU) 100 outputs a control signal to the control pressure regulating valve 110, the control pressure regulating valve 110 outputs a pressure in proportion to the control signal, and the output pressure of the control pressure regulating valve 110 is applied to a control chamber (i.e., the control interface 131) of the jointing pressure regulating valve 130 and a control chamber (i.e., the input interface 121) of the pressure switching valve 120. When the output pressure of the control pressure regulating valve 110 is lower than a set value of the spring 127 of the pressure switching valve 120, the input interface 122 of the pressure switching valve 120 is communicated with a chamber where the output interface 125 is located, and the control pressure enters a reverse control pressure chamber (i.e., the pressure relief port 132) of the jointing pressure regulating valve 130 via the interfaces 122 and 125. As the control pressure of the control pressure regulating valve 110 is applied in a smaller area, the jointing pressure regulating valve 130 outputs a jointing pressure with a smaller variation rate. When the output pressure of the control pressure regulating valve 110 is higher than the set valve of the spring 127 of the pressure switching valve 120, the interface 123 and the interface 125 of the pressure switching valve 120 communicate with each other, and a pressure of the oil drainage chamber enters the reverse control pressure chamber (i.e., the pressure relief port 132) of the jointing pressure regulating valve 130 via the interfaces 123 and 125, so that the control pressure of the control pressure regulating valve 110 is applied in a larger area and the variation rate of the jointing pressure is increased.

Figure 9:
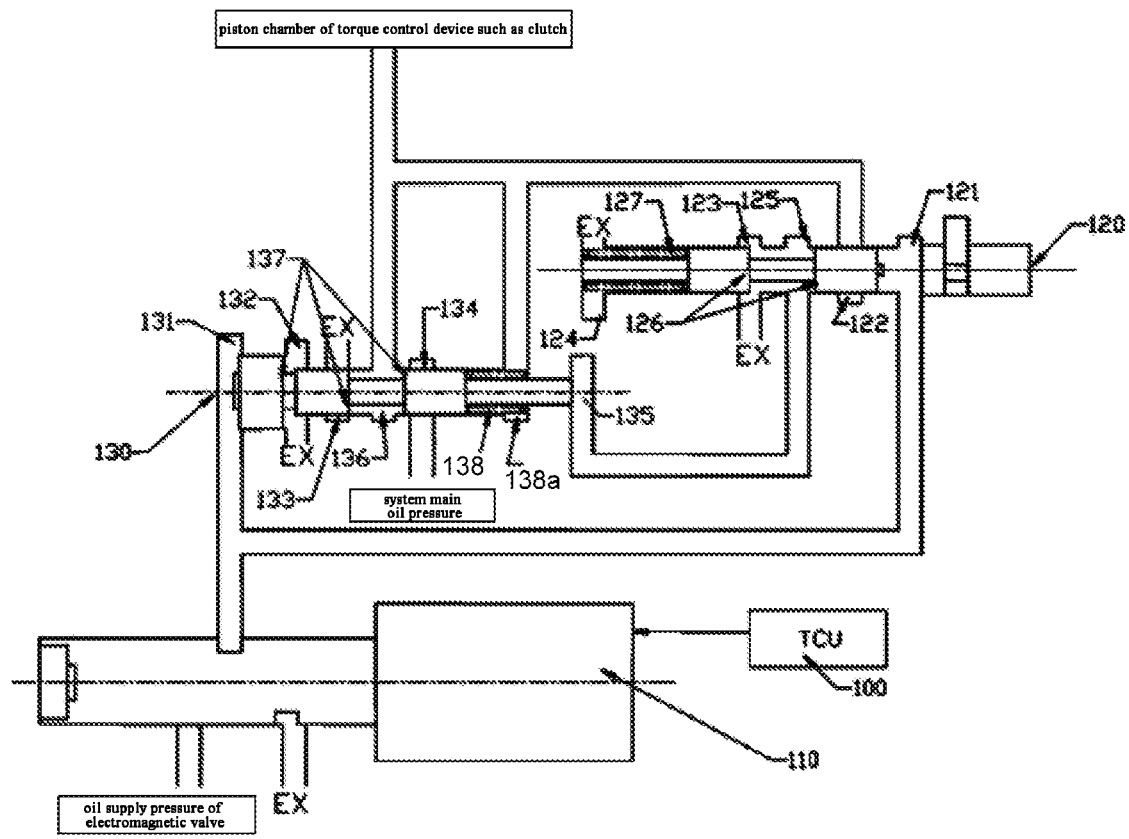

In FIG. 9, a pressure control system includes an electronic control device (TCU) 100 and a control pressure regulating valve 110, where the control pressure regulating valve 110 is generally an electromagnetic valve; a pressure switching valve 120, a control interface 121 located in the pressure switching valve and connected to an oil passage of the control pressure, an input interface 122 located in the pressure switching valve and used for receiving a jointing pressure from a jointing pressure control valve, a pressure relief port 123 in the pressure switching valve, a spring chamber or an oil drainage pressure 124 in the pressure switching valve, an output interface 125 located in the pressure switching valve and connected to a feedback interface of a jointing pressure regulating valve, a valve core 126 in the pressure switching valve, and a spring 127 in the pressure switching valve; and a jointing pressure regulating valve 130, a control interface 131 located in the jointing pressure regulating valve and used for receiving the control pressure, a pressure relief port 132 in the jointing pressure regulating valve, a pressure relief port 133 in the jointing pressure regulating valve, a system main pressure input port 134 in the jointing pressure regulating valve, a feedback interface 135 located in the jointing pressure regulating valve and connected to an output port of the pressure switching valve, a jointing pressure output interface 136 located in the jointing pressure regulating valve and connected to a piston chamber of a torque control device, a valve core 137 in the jointing pressure regulating valve, a spring 138 in the jointing pressure regulating valve, and a jointing pressure feedback interface and a spring chamber 138a in the jointing pressure regulating valve 130.

The electronic control device (TCU) 100 outputs a control signal to the control pressure regulating valve 110, the control pressure regulating valve 110 outputs a pressure in proportion to the control signal, and the output pressure of the control pressure regulating valve 110 is applied to a control chamber (i.e., the control interface 121) of the pressure switching valve 120 and the control interface 131 of the jointing pressure regulating valve 130. When the output pressure of the control pressure regulating valve 110 is lower than a set value of the spring 127 of the pressure switching valve 120, the chambers where the interfaces 122 and 125 of the pressure switching valve 120 are located communicate with each other, and a jointing pressure of the piston chamber enters a feedback chamber (i.e., a chamber to which the feedback interface 135 is connected) of the jointing pressure regulating valve 130 via the interfaces 122 and 125. As the feedback area of the pressure of the jointing pressure regulating valve 130 is increased, the jointing pressure regulating 130 outputs a jointing pressure with a smaller slope and being in proportion to the control pressure of the control pressure regulating valve 110. When the output pressure of the control pressure regulating valve 110 is higher than the set valve of the spring of the pressure switching valve 120, the chambers to which the interfaces 123 and 125 of the pressure switching valve 120 are connected communicate with each other, and an oil drainage chamber enters the feedback interface 135 located in the jointing pressure regulating valve and connected to the output port of the pressure switching valve via the interfaces 123 and 125, and the feedback interface 135 of the jointing pressure regulating valve 130 releases pressure, so that the feedback area of the jointing pressure regulating valve 130 is reduced, and the jointing pressure regulating valve 130 outputs a jointing pressure with a larger slope and being in proportion to the control pressure of the control pressure regulating valve 110.

Figure 2:
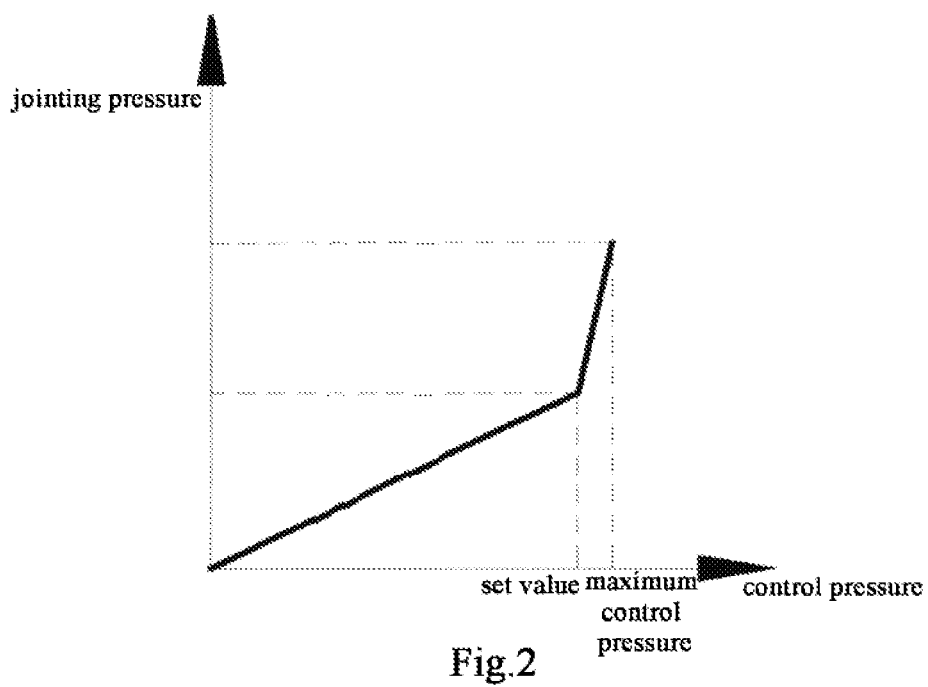

In Embodiments 6-7 described above, the relation between a control pressure and a jointing pressure is shown as FIG. 2. During the torque transmission devices are jointed, by a switching of the pressure switching valve, the apply area of the control pressure of the jointing pressure regulating valve is reduced or the feedback area is increased, it is advantageous for a precise control to the jointing pressure adopting a jointing pressure with a smaller variation slope and being in proportion to the control pressure of the control pressure regulating valve; Furthermore, after the torque transmission devices are jointed, that is, after there is no relative slip, by a switching of the pressure switching valve, the apply area of the control pressure of the jointing pressure regulating valve is increased or the feedback area is reduced, so that the variation slope of the jointing pressure is increased and an adequate torque capacity is ensured.

The invention claimed is:

1. A pressure control system for a torque control device, characterized in that, the system comprises:
    an electronic control device;
    a control pressure regulating valve for receiving a control signal from the electronic control device and outputting a control pressure, the control pressure regulating valve being connected to an oil passage of the control pressure;
    a fixed pressure oil passage, which is an oil passage for supplying oil to the control pressure regulating valve;
    a pressure switching valve, which has
        a first input interface for receiving a jointing pressure,
        a second input interface for receiving the fixed pressure,
        an output interface connected to a feedback interface of a jointing pressure regulating valve, and
        a control interface located on one side of a valve core of the pressure switching valve and connected to the oil passage of the control pressure;
    the jointing pressure regulating valve, which has
        an input interface connected to an oil passage of a system main oil pressure,
        an output interface outputting the jointing pressure, the output interface being connected to a piston chamber of the torque control device,
        the feedback interface and a spring chamber that are located on one side of a valve core of the jointing pressure regulating valve and used for receiving a pressure output from the pressure switching valve, and
        a control interface located on the other side of the valve core of the jointing pressure regulating valve and connected to the oil passage of the control pressure; and
    when the control pressure is lower than a set value of a spring of the pressure switching valve, the pressure switching valve connects the output interface of the jointing pressure regulating valve with the feedback interface of the jointing pressure regulating valve, and the jointing pressure regulating valve outputs the jointing pressure in proportion to the control signal; and,
    when the control pressure reaches the set value of the spring of the pressure switching valve, the pressure switching valve connects the fixed pressure oil passage with the feedback interface of the jointing pressure regulating valve, and the jointing pressure regulating valve allows the system main oil pressure to be communicated to the output interface of the jointing pressure regulating valve.

2. A pressure control system for a torque control device, characterized in that, the system comprises:
    an electronic control device;
    a control pressure regulating valve for receiving a control signal from the electronic control device and outputting a control pressure, the control pressure regulating valve being connected to an oil passage of the control pressure;
    a fixed pressure oil passage, which is an oil passage for supplying oil to the control pressure regulating valve;
    a pressure switching valve, which has
        a first input interface for receiving a jointing pressure,
        a second input interface for receiving the control pressure,
        an output interface connected to a feedback interface of a jointing pressure regulating valve, and
        a control interface located on one side of a valve core of the pressure switching valve and connected to the oil passage of the control pressure;
    the jointing pressure regulating valve, which has
        an input interface connected to an oil passage of a system main oil pressure,
        an output interface outputting the jointing pressure, the output interface being connected to a piston chamber of the torque control device, and
        the feedback interface and a spring chamber that are located on one side of a valve core of the jointing pressure regulating valve and used for receiving a pressure output from the pressure switching valve;
        a control interface located on the other side of the valve core of the jointing pressure regulating valve and connected to the oil passage of the control pressure; and
    when the control pressure is lower than a set value of a spring of the pressure switching valve, the pressure switching valve connects the output interface of the jointing pressure regulating valve with the feedback interface of the jointing pressure regulating valve, and the jointing pressure control valve outputs the jointing pressure in proportion to the control signal; and,
    when the control pressure reaches the set value of the spring of the pressure switching valve, the pressure switching valve connects the oil passage of the control pressure with the feedback interface of the jointing pressure regulating valve, and the jointing pressure regulating valve allows the system main oil pressure to be communicated to the output interface of the jointing pressure regulating valve.

3. A pressure control system for a torque control device, characterized in that, the system comprises:
    an electronic control device;

a control pressure regulating valve for receiving a control signal from the electronic control device and outputting a control pressure, the control pressure regulating valve being connected to an oil passage of the control pressure;
a fixed pressure oil passage, which is an oil passage for supplying oil to the control pressure regulating valve;
a pressure switching valve, which has
  a first input interface for receiving a jointing pressure,
  a second input interface for receiving the control pressure,
  an output interface connected to a control interface of a jointing pressure regulating valve, and
  a control interface located on one side of a valve core of the pressure switching valve and connected to the oil passage of the control pressure;
the jointing pressure regulating valve, which has
  an input interface connected to an oil passage of a system main oil pressure,
  an output interface outputting the jointing pressure, the output interface being connected to a piston chamber of the torque control device,
  the feedback interface and a spring chamber that are located on one side of a valve core of the jointing pressure regulating valve and used for receiving the jointing pressure, and
  a control interface located on the other side of the valve core of the jointing pressure regulating valve and used for receiving an output of the pressure switching valve; and
when the control pressure is lower than a set value of a spring of the pressure switching valve, the pressure switching valve connects the oil passage of the control pressure with the control interface of the jointing pressure regulating valve, and the jointing pressure regulating valve outputs the jointing pressure in proportion to the control signal; and,
when the control pressure reaches the set value of the spring of the pressure switching valve, the pressure switching valve connects the output interface of the jointing pressure regulating valve with the control interface of the jointing pressure regulating valve, and the jointing pressure regulating valve allows the system main oil pressure to be communicated to the output interface of the jointing pressure regulating valve.

4. A pressure control system for a torque control device, characterized in that, the system comprises:
an electronic control device;
a control pressure regulating valve for receiving a control signal from the electronic control device and outputting a control pressure, the control pressure regulating valve being connected to an oil passage of the control pressure;
a fixed pressure oil passage, which is an oil passage for supplying oil to the control pressure regulating valve;
a pressure switching valve, which has
  a first input interface for receiving a jointing pressure,
  a second input interface for receiving a pressure relief chamber,
  an output interface connected to a control interface of a jointing pressure regulating valve, and
  a control interface located on one side of a valve core of the pressure switching valve and connected to the oil passage of the control pressure;
a selecting valve, which consists of a steel ball and has a first input port for receiving the control pressure,
  a second input port for receiving an output of the pressure switching valve, and
  an output port connected to a control chamber of the jointing pressure regulating valve, the output port being always in communication with the input port having a larger pressure;
the jointing pressure regulating valve, which has
  an input interface connected to an oil passage of a system main oil pressure,
  an output interface outputting the jointing pressure, the output interface being connected to a piston chamber of the torque control device,
  a feedback interface and a spring chamber that are located on one side of a valve core of the jointing pressure regulating valve and used for receiving the jointing pressure, and
  a control interface located on the other side of the valve core of the jointing pressure regulating valve and used for receiving an output of the selecting valve; and
when the control pressure is lower than a set value of a spring of the pressure switching valve, the pressure switching valve connects the pressure relief chamber with the second input port of the selecting valve, the control pressure enters the control interface of the jointing pressure regulating valve via the selecting valve, and the jointing pressure regulating valve outputs the jointing pressure in proportion to the control signal; and,
when the control pressure reaches the set value of the spring of the pressure switching valve, the pressure switching valve connects the output interface of the jointing pressure regulating valve with the second input port of the selecting valve, the output interface of the jointing pressure regulating valve is connected to the control interface of the jointing pressure regulating valve via the selecting valve, and the jointing pressure regulating valve allows the system main oil pressure to be communicated to the output interface of the jointing pressure regulating valve.

5. A pressure control system for a torque control device, characterized in that, the system comprises:
an electronic control device;
a control pressure regulating valve for receiving a control signal from the electronic control device and outputting a control pressure, the control pressure regulating valve being connected to an oil passage of the control pressure;
a fixed pressure oil passage, which is an oil passage for supplying oil to the control pressure regulating valve;
a pressure switching valve, which has
  a first input interface for receiving a jointing pressure,
  a second input interface for receiving an oil drainage chamber,
  an output interface connected to a control interface of a jointing pressure regulating valve, and
  a control interface located on one side of a valve core of the pressure switching valve and connected to the oil passage of the control pressure;
the jointing pressure regulating valve, which has
  an input interface connected to an oil passage of a system main oil pressure,
  an output interface outputting the jointing pressure, the output interface being connected to a piston chamber of the torque control device, a feedback interface and a spring chamber that are located on one side of a valve core of the jointing pressure regulating valve and used for receiving the jointing pressure, and a control interface for receiving an output of the pressure switching valve and a second control interface for receiving the control pressure that are located on the other side of the valve core of the jointing pressure regulating valve; and when the control pressure is lower than a set value of a spring of the pressure switching valve, the pressure switching valve connects the oil drainage chamber with the control interface of the jointing pressure regulating valve, and the jointing pressure regulating valve outputs the jointing pressure in proportion to the control signal; and, when the control pressure reaches the set value of the spring of the pressure switching valve, the pressure switching valve connects the output interface of the jointing pressure regulating valve with the control interface of the jointing pressure regulating valve, and the jointing pressure regulating valve allows the system main oil pressure to be communicated to the output interface of the jointing pressure regulating valve.

6. A pressure control system for a torque control device, characterized in that, the system comprises:

an electronic control device;

a control pressure regulating valve for receiving a control signal from the electronic control device and outputting a control pressure, the control pressure regulating valve being connected to an oil passage of the control pressure;

a fixed pressure oil passage, which is an oil passage for supplying oil to the control pressure regulating valve;

a pressure switching valve, which has
  a first input interface for receiving the control pressure,
  a second input interface for receiving a pressure relief chamber,
  an output interface connected to a reverse control interface of a jointing pressure regulating valve, and
  a control interface located on one side of a valve core of the pressure switching valve and connected to the oil passage of the control pressure;

the jointing pressure regulating valve, which has
  an input interface connected to an oil passage of a system main oil pressure,
  an output interface outputting the jointing pressure, the output interface being connected to a piston chamber of the torque control device,
  a feedback interface and a spring chamber that are located on one side of a valve core of the jointing pressure regulating valve and used for receiving the jointing pressure,
  a control interface located on the other side of the valve core of the jointing pressure regulating valve and connected to the oil passage of the control pressure; and
  the reverse control interface which has a reverse apply direction to the control interface;

when the control pressure is lower than a set value of a spring of the pressure switching valve, the pressure switching valve connects the oil passage of the control pressure with the reverse control interface of the jointing pressure regulating valve, and the jointing pressure regulating valve outputs the jointing pressure in proportion to the control signal with a first variation rate; and, when the control pressure reaches the set value of the spring of the pressure switching valve, the pressure switching valve connects the pressure relief chamber with the reverse control interface of the jointing pressure regulating valve, and the jointing pressure regulating valve outputs the jointing pressure in proportion to the control signal with a second variation rate, the second variation rate being larger than the first variation rate.

7. A pressure control system for a torque control device, characterized in that, the system comprises:

an electronic control device;

a control pressure regulating valve for receiving a control signal from the electronic control device and outputting a control pressure, the control pressure regulating valve being connected to an oil passage of the control pressure;

a fixed pressure oil passage, which is an oil passage for supplying oil to the control pressure regulating valve;

a pressure switching valve, which has
  a first input interface for receiving a jointing pressure,
  a second input interface for receiving an oil drainage chamber,
  an output interface connected to a feedback interface of a jointing pressure regulating valve, and
  a control interface located on one side of a valve core of the pressure switching valve and connected to the oil passage of the control pressure;

the jointing pressure regulating valve, which has
  an input interface connected to an oil passage of a system main oil pressure,
  an output interface outputting the jointing pressure, the output interface being connected to a piston chamber of the torque control device,
  the feedback interface and a spring chamber for receiving a pressure output from the pressure switching valve and a second feedback port connected to the output interface of the jointing pressure regulating valve that are located on one side of a valve core of the jointing pressure regulating valve, and
  a control interface located on the other side of the valve core of the jointing pressure regulating valve and used for receiving the control pressure; and when the control pressure is lower than a set value of a spring of the pressure switching valve, the pressure switching valve connects the output interface of the jointing pressure regulating valve with the feedback interface of the jointing pressure regulating valve, a feedback area of the jointing pressure regulating valve is increased, and the jointing pressure regulating valve outputs the jointing pressure in proportion to the control signal with a first variation rate; and, when the control pressure reaches the set value of the spring of the pressure switching valve, the pressure switching valve connects the oil drainage chamber with the feedback interface of the jointing pressure regulating valve, the feedback area of the jointing pressure regulation valve is decreased, and the jointing pressure regulating valve outputs the jointing pressure in proportion to the control signal with a second variation rate, the second variation rate being larger than the first variation slope.

* * * * *